United States Patent [19]
Posso

[11] 3,934,842
[45] Jan. 27, 1976

[54] MINICASSETTE FOR RECORDING TAPE

[76] Inventor: Patrick Posso, 10, Avenue Jurigoz, Lausanne, Switzerland

[22] Filed: Sept. 12, 1973

[21] Appl. No.: 396,532

[30] Foreign Application Priority Data
Oct. 2, 1972 France .............................. 72.34835

[52] U.S. Cl. ............................................. 242/199
[51] Int. Cl.² ...................... G03B 1/04; G11B 15/32; G11B 23/04
[58] Field of Search .......... 242/199, 200, 198, 71.2, 242/76

[56] References Cited
UNITED STATES PATENTS

| | | |
|---|---|---|
| 3,432,111 | 3/1969 | Ryder .............................. 242/199 |
| 3,495,787 | 2/1970 | Wallace .............................. 242/199 |
| 3,642,228 | 2/1972 | Tolkuhn .............................. 242/199 |
| 3,706,426 | 12/1972 | Prahl .............................. 242/198 |
| 3,796,394 | 3/1974 | Souza .............................. 242/199 |

Primary Examiner—Leonard D. Christian
Attorney, Agent, or Firm—Spencer & Kaye

[57] ABSTRACT

A minicassette for recording tape which is constituted by a body, a cover and a tape guide all molded independently of plastic. The tape guide is positioned in the body by the cover and is of low friction anti-abrasive material molded in a mold having an interface parallel to sliding surfaces for the tape provided in the guide.

7 Claims, 4 Drawing Figures

MINICASSETTE FOR RECORDING TAPE

BACKGROUND OF THE INVENTION

The present invention relates to improvements in cases containing a recording tape wound on two reels and able to pass in one direction or the other in front of an aperture, on the other side of which is located a recording and/or reading head when such a case in mounted in the apparatus provided with this head. Cases of this type are generally known as "minicassettes" and are called by this name hereafter.

There are numerous types of minicassettes currently in existence. They all comprise a casing body and a cover fitting one in the other and provided internally with means, produced by molding, for mounting the reels so that they may rotate, guiding the tape in a rectilinear manner in front of the aforesaid head and pressing this tape against the latter.

Until recent years, a major factor in the selling of minicassettes was the lowest possible manufacturing cost and, within this framework, the best possible operation as well as convenient and rapid loading of the tape into the cassette.

There is no doubt that it is difficult to reconcile these various requirements.

Thus, in order to reduce the cost price, cheap plastic materials were used which did not have the desirable rigidity for preventing deformations which are liable to jeopardize the quality of operation.

For this same purpose, attempts have been made to reduce the number of components which are limited to only two parts: a casing body and a cover. This produces difficulties as regards the production of molds and more specifically the passage for the tape. In fact, as regards this latter part, the mold has to be produced by erosion which is bad as regards the smoothness of the sliding surfaces; in addition, owing to the height of the thin projecting parts defining this passage, a slight clearance must be allowed in order that stripping is possible, which is clearly detrimental to the perpendicularity of said passage and consequently to the guiding of the tape in front of the recording and reading head; moreover, since these thin projecting parts are fragile, it is inevitable that now and then certain of them break and if this is not noticed immediately, the parts molded subsequent thereto which are without them can only be rejected; furthermore, the decrease in the cost price due to the limitation of the number of parts is not as considerable as one could have hoped, because, given the extreme complexity of the mold, the cost of the latter is relatively great and one thus abandons producing as many of them as the series of minicassettes to be produced would require, which has the result of increasing their daily production period and of accepting delivery difficulties which may result from inevitable breakdowns. Finally, loading of the tape into the casing is made very difficult by the narrow passage which exists between the tape-guide and the strips protecting the front face in which is provided the aperture for the passage of the aforesaid head.

The preceding explanation shows that a substantial decrease in the cost price is thus obtained, but that the operation of the minicassette, if satisfactory for customary applications, is nevertheless imperfect for new applications explained hereafter.

On the other hand, a desire for better sliding and correct guidance of the tape as well as constant tension, which are prerequisites for good winding of the tape on the spools, leads to the production of various additional systems using bosses, rollers, guides, etc., but which, for reasons already explained, do not always make it possible to obtain the operation required for these new applications.

In fact, the use of the minicassette has recently been extended to recording data (for example on cash registers in super-markets) and for the processing of this data in a computer (in particular records of stocks and supplies). Now, within this framework, the primordial quality desired is the perfection of operation of the minicassette, the cost price, although constituting an important factor in the commercial success, thus being relegated to the background. The quality of operation relates to the sliding of the tape, its correct guidance and its constant tension particularly in the rectilinear part of its passage opposite the recording head, and its constant travelling speed as well as its high rewinding speed without damage.

However, such quality of operation cannot be obtained with known minicassettes.

SUMMARY OF THE INVENTION

Thus, the essential object of the present invention is to use means which make it possible to obtain practically perfect operation, which is obviously of prime importance for the storage of data to be processed by a computer and which is advantageous for all the other applications for sound recording.

To this end, it is the object of the invention to obtain a tape passage which is perfectly smooth and perpendicular to the reference surface of the minicassette with respect to which the recording and reading head is positioned.

Its object is also to facilitate the use, solely for constituting the tape-guide, of a material guaranteeing perfect sliding and with no abrasion of the tape, i.e., smoothly.

Its object is also to control the tension of the tape in the tape-guide, such that it is always absolutely constant.

Its object is also to reduce the pulling force exerted on the tape for unwinding it, whatever the extent of the change of direction of travel of this tape between the winding reel and the tape-guide.

It is a subsidiary object of the present invention to reduce the cost price of the minicassette, on the one hand, by simplifying and facilitating construction of the molds to such an extent that the number of impressions taken is not too great, on the other hand, by making it easier to insepct the parts owing to their slight complexity, and finally, by adapting the choice of materials used to the destination of the minicassette. Thus, for the manufacture of a minicassette for the reproduction of sound, a cheap plastic material may be used in the molds, whereas for the manufacture of a minicassette for storing data which may be processed by a computer, one may seek a much more rigid material to be used in the same molds as previously, even though it may be more difficult.

Finally, it is the object of the present invention to greatly facilitate the loading of the recording tape into the minicassette, by avoiding the necessity of sliding the latter through narrow, deep and winding passages.

According to the invention, the minicassette comprises, in addition to its body and cover, a third part constituted by the tape-guide which is positioned in the body by projecting parts and immobilized by the cover, this tape-guide being made from an anti-abrasive material and having a very low coefficient of friction, it is molded in a flat condition, i.e., in a position such that the interface of its mold is perpendicular to that of the molds of said two other parts and thus the sliding surface defined by this tape-guide for the passage of the tape is absolutley perpendicular to the reference surface of the minicassette provided for mounting it in the apparatus.

Various other features and advantages of the invention will become apparent from the following detailed description.

BRIEF DESCRIPTION OF THE DRAWING

One embodiment of the object of the invention is illustrated, as a non-limiting example, in the accompanying drawing.

DESCRIPTION OF THE PREFERRED EMBODIMENT

Figure 1:
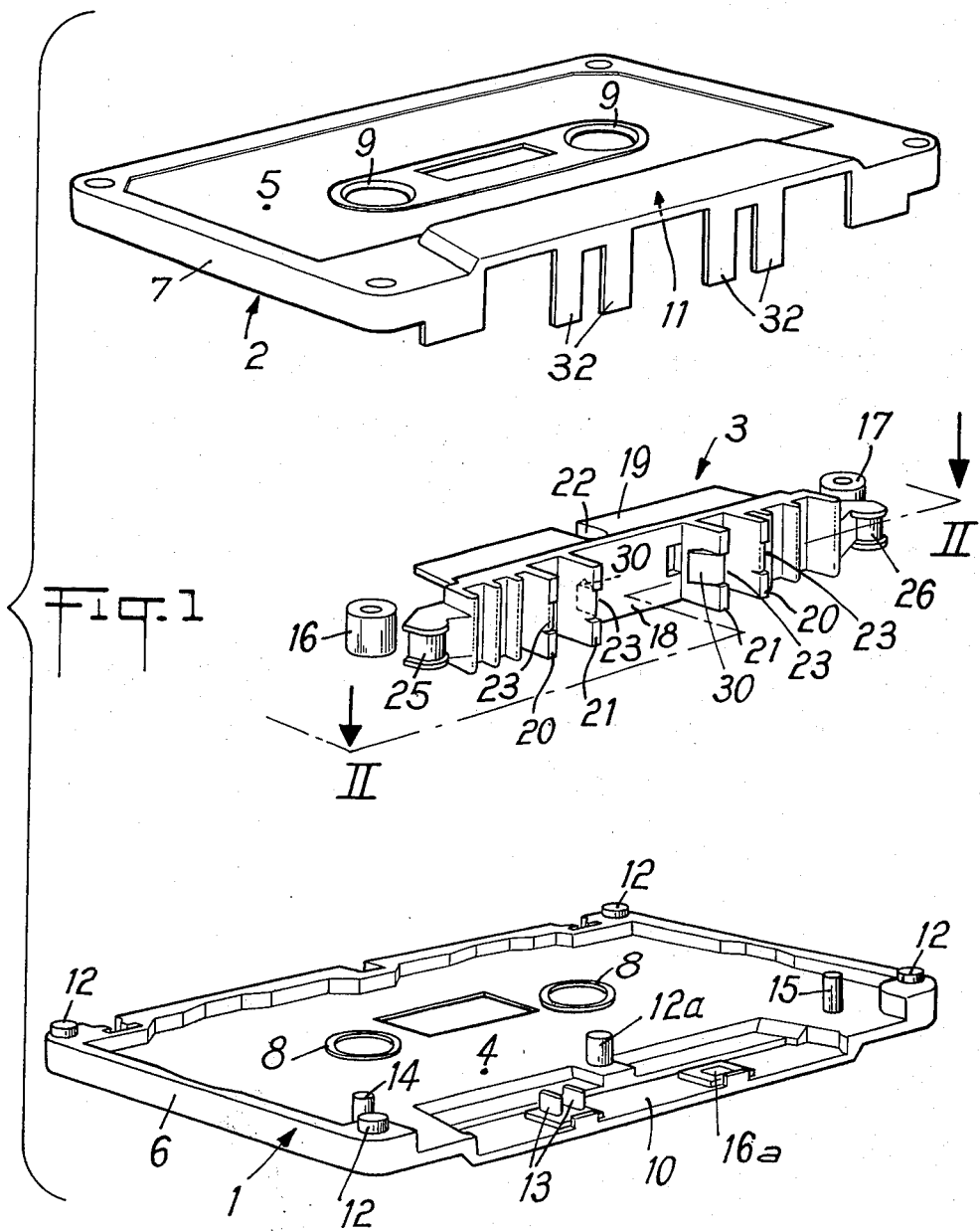
FIG. 1 is an exploded perspective view showing the minicassette according to the invention.

As is clearly apparent from FIG. 1, the casing proper of the minicassette according to the invention comprises three parts constituted by a body 1, a cover 2 and a tape-guide 3.

The body 1 and cover 2 are obtained by molding a material which is appropriate to the intended use of the minicassette; if the latter is intended to be used for sound reproduction for example, the aforesaid parts are made from cheap material, in particular from standard polystyrene; on the other hand, if it is a question of storing data with a view to their processing by a computer, these parts are constituted by a rigid material such as acrylonitrile reinforced with glass fibers or balls.

The tape-guide 3 is also produced by molding, but, whatever the destination of the minicassette, the initial material used must be anti-abrasive and must have a coefficient of friction which is as low as possible. For example, this tape-guide may be constituted by a polyacetal resin such as that known by the name "Delrin."

The body 1 and cover 2 are designed such that they may be easily molded. Thus, the projecting parts which they comprise are as few as possible, their height being low and their width and spacing not being too small in order to eliminate any difficulties during stripping.

The base 4 of the body and the base 5 of the cover are surrounded by a border 6, 7 respectively, extending along the sides and at the rear to half the depth of the minicassette; they are integral with two annular rings 8 and 9 intended for centering and mounting two loose reels so that they may rotate and which are not shown in the drawing.

These bases 4 and 5 also define recesses 10 and 11 located opposite each other when the cover is fitted on the body by means of projections 12 and provided for housing the tape-guide 3 which is perfectly positioned at the time of mounting owing to a pin 12a and lugs 13 molded integrally with the body.

The base 4 of the body also comprises two pins 14, 15 about which are loosely mounted rollers 16, 17 as well as an aperture 16a facilitating the correct positioning of the cassette in the apparatus using the latter and which, to this end, comprises positioning means known per se.

Figure 2:
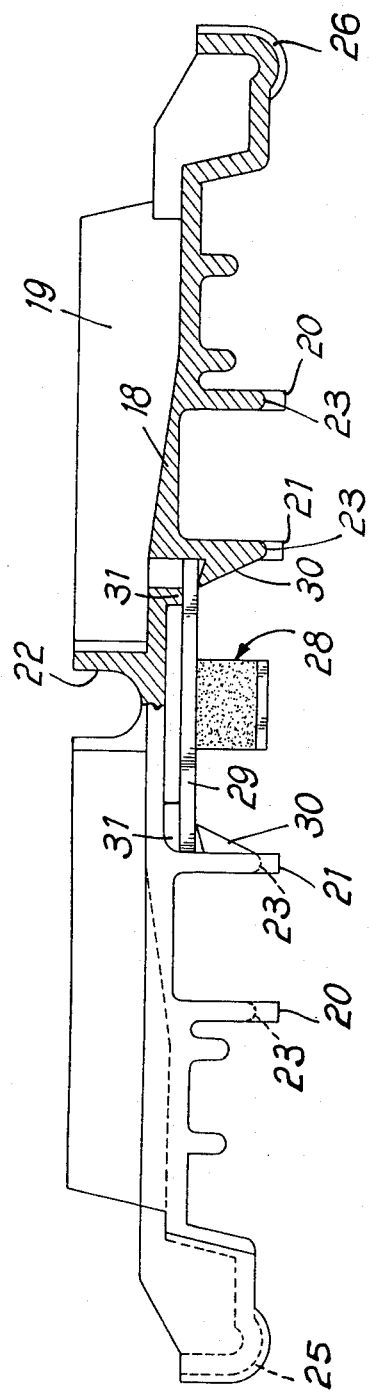
FIG. 2 is an elevational view partially in longitudinal section illustrating the tape-guide to an enlarged scale.

The tape-guide 3 is in one piece and comprises (FIGS. 1 and 2) an elongated web 18, integral at its rear side with two longitudinal ribs 19 and, at its front side with transverse tabs 20, 21 which are four in number in the example shown.

The ribs 19 define a notch 22 fitting on the pin 12a of the body in order to define the position of the tape-guide in the longitudinal direction. The one pair of tabs 20 and 21 located opposite the lugs 13, cooperate with the latter by abutment to define the position of the tape-guide in the transverse direction i.e., the direction between bases 4 and 5.

Each of the four tabs 20 and 21 is formed with a central notch 23 whose edge is rounded. All these rounded edges are co-planar and define the sliding surface for the tape. It is important to note that the interface of the molds serving to manufacture the body 1 and cover 2 is parallel to the bases 4 and 5 of the latter, but that the interface of the mold 24 (FIG. 4), serving to manufacture the tape-guide 3 is, if one considers the latter in position in the body, perpendicular to the base 4 which is the reference surface of the minicassette facilitating the correct mounting of the latter in its apparatus. In other words, the surfaces which must inevitably be provided with a clearance on the tape-guide to facilitate stripping of the latter (FIG. 4) are perpendicular to the rounded edges of the notches 23 defining the sliding surface for the tape. In other words, this sliding surface, like other parts described hereafter which are parallel thereto, will be absolutely parallel to the geometric axes of rotation of the reels and to the support face of the recording and reading head. From that time onwards, the tape is guided in order to unwind in front of the head under perfect conditions. Moreover, owing to the nature of the tape-guide (material which is anti-abrasive and has a low coefficient of friction) and to the reduction of its contact surface (rounded edges of the notches), this tape-guide produces only extremely reduced resistance to the passage of the tape.

Figure 3:
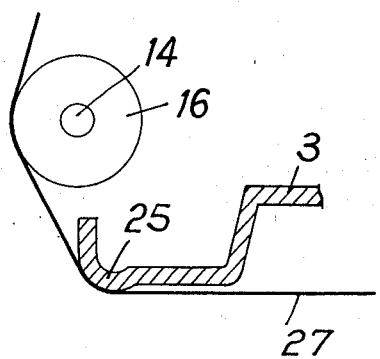
FIG. 3 is a partial view to an enlarged scale showing the guiding of the tape.

The tape-guide 3 also comprises, projecting from its front face and from its ends, bosses 25, 26 of cylindrical shape, preferably extending slightly in front of the sliding surface. The stationary bosses cooperate with rollers 16, 17 loosely mounted on pins 14, 15 of the casing, to constitute return members (FIG. 3) for the recording tape 27 passing through the tape-guide 3 towards the winding reel. Due to the fact that they are stationary, these bosses form a better guide for the tape, thus avoiding its lateral floating. They also make it possible to regulate the tension of this tape as it passes through the tape-guide, by making it constant. The rollers 16, 17 are intended to reduce the pulling force on the tape as it changes direction, particularly at the beginning of winding.

Finally, the tape-guide 3 serves as a support for a pressing member 28 elastically applying the tape 27 against the recording and reading head. In the example shown, the pressing member 28 comprises a rear support plate 29 intended to be retained by the tape-guide. To this end, the central tabs 21 are integral with projections 30 in the shape of inclined ramps and separated from the bosses 31; when it is mounted, the plate 29 is pressed against these ramps 30 and deforms such that after crossing the latter, it expands, its ends being housed between said projections and said bosses.

To mount a minicassette, the tape-guide 3 is housed in the recess 10 of the body and a full reel and an empty reel are placed on the annular rings 8, and the rollers 16, 17 are placed on the pins 14, 15. It will be noted that the sliding surface of the tape-guide is completely free at the front, since the front edge of the body 1 has no border 6. Under these circumstances, it is very easy to put the recording tape 27 in position. In fact, if the full supply reel is mounted for example on the left-hand ring (FIG. 1) it is sufficient to pull on the tape, to pass it over the roller 16 and boss 25, then to place it in the notches 23 of the tabs 20, 21, to pass it over the boss 26 and roller 17, and finally to attach it to the center of the empty take-up reel. When the recording tape is thus in position, the cover 2 is fitted.

It will be noted that despite the absence of a front border on the body, this tape is still protected. In fact, the border 7 of the cover extends as far as the recess 11 and the base 5 is integral, opposite the latter in the regions not serving for the passage of any part, with protecting strips 32 higher than said border in order to come into contact with the base 4 of the body.

Figure 4:
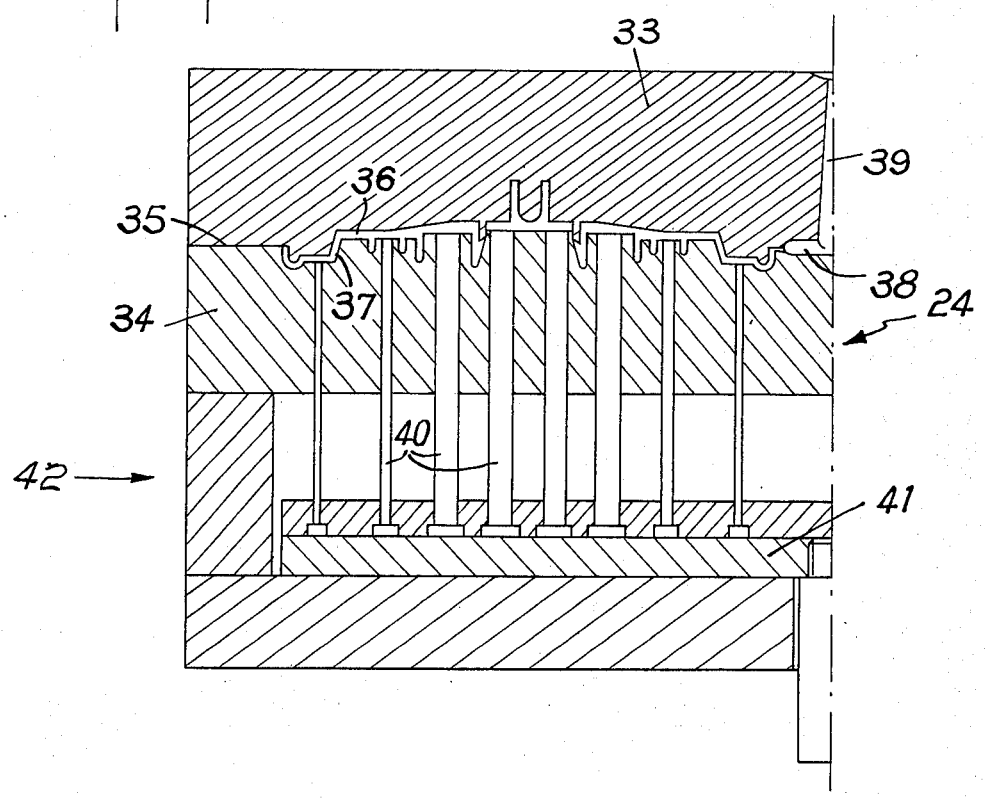
FIG. 4 is a cross-sectional view of the tape-guide mold.

FIG. 4 illustrating the mold 24 shows not only that the sliding surface of the tape-guide obtained with this mold is absolutely parallel to the front face, but also that said mold is very simple to produce, that the number of impressions taken may be considerable without fear of complications and that stripping is very easy.

This mold comprises a top 33 and bottom 34 whose contact faces forming the interface or parting plane 35 define opposing impressions 36, 37 shaped in a complementary manner to form the tape-guide. Opening into these impressions is, firstly, a branch 38 of the injection pipe 39, secondly, ejection rods 40 guided in the bottom 34, flush with the lower impression 37 and integral with a control plate 41 movably located in a casing 42.

The minicassette which is the object of the invention may be used for the reproduction of sound or for the storage of data with a view to their processing by a computer.

What is claimed is:

1. In a minicassette for holding a recording tape, for use in a tape machine provided with a recording and/or playback head, the minicassette including a first member constituting a casing body having a base portion, a second member constituting a casing cover having a base portion and fitting on the first member with the base portions parallel, to define an enclosed space for holding a tape supply reel and a tape take-up reel, and means associated with the members for holding such reels in position, the improvement wherein:

said minicassette further comprises a third molded member formed independently of, and arranged to be disposed between, said first and second members and constituting a tape-guide for said minicassette, said third member comprising an elongated web portion and being of an anti-abrasive material having a low coefficient of friction relative to the recording tape and being provided with projecting portions defining a tape sliding surface absolutely perpendicular to the base portions of said first and second members, said projecting portions being in the form of tabs projecting from said web portion and each provided with a notch located at its center and defining part of said tape sliding surface; two of said tabs being located at a central region of said web portion and being spaced apart to define, with the part of said web portion disposed therebetween, a housing for holding a pressing member provided to cooperate with the tape machine head; and said two tabs being provided with lateral projections directed toward the region constituting said housing for engaging the pressing member to cause such member to be gripped between said part of said web portion and said lateral projections;

said first member is provided with projecting portions arranged to position said third member relative to said first member; and said members are dimensioned for causing said third member to be immobilized in position between said first and second members when said second member is fitted on said first member.

2. An arrangement as defined in claim 1 wherein said third member is made of a polyacetal resin.

3. An arrangement as defined in claim 1 wherein each said notch has a rounded surface, and the rounded surfaces of all of said notches have a common tangent plane, with the lines of tangency to such common plane constituting said tape sliding surface.

4. An arrangement as defined in claim 1 wherein said third member is elongate in the direction of recording tape movement therealong and is further provided, at each end, with a stationary boss presenting a cylindrical tape guide surface for guiding recording tape between said third member and a respective reel in a manner to stabilize the lateral position of the tape and the tension on the length of tape which extends along said third member.

5. An arrangement as defined in claim 4 further comprising a pair of rollers mounted between said first and second members to be freely rotatable and each located between a respective stationary boss and the location of a respective reel to permit the tape to pass around each said roller while traveling between said third member and such respective reel.

6. An arrangement as defined in claim 1 wherein the lateral edge portion of said body which is disposed in front of said tape sliding surface, when said minicassette is assembled, is completely open for facilitating loading of a tape prior to assembly, and said cover is provided with protective strip members located to extend across such open portion of said body and dimensioned to extend to said base portion of said body when said minicassette is assembled.

7. An arrangement as defined in claim 1 wherein said third member is fabricated in a two-part mold having a parting plane parallel to said tape sliding surface.

* * * * *